United States Patent [19]
Abriles et al.

[11] Patent Number: 6,164,904
[45] Date of Patent: Dec. 26, 2000

[54] ASSEMBLY FOR BRAZING A STATOR COMPONENT OF A GAS TURBINE ENGINE AND METHOD BRAZING ARTICLES SUCH AS AN ABRADABLE MATERIAL TO A STATOR OF A GAS TURBINE ENGINE

[75] Inventors: Beth Kwiatkowski Abriles, North Branford; David Norwood Potter, Meriden, both of Conn.

[73] Assignee: United Technologies Corporation, Hartford, Conn.

[21] Appl. No.: 09/130,855

[22] Filed: Aug. 7, 1998

[51] Int. Cl.$^7$ ........................................................ F01D 9/04
[52] U.S. Cl. ........................ 415/139; 415/173.4; 415/196; 228/159; 228/201; 228/216; 228/233.2
[58] Field of Search ..................................... 415/138, 139, 415/173.4, 173.5, 174.4, 174.5, 191, 196, 197; 228/118, 159, 212, 215, 216, 201, 245, 249, 252, 233.2, 235.1

[56] References Cited

U.S. PATENT DOCUMENTS

| | | |
|---|---|---|
| 3,001,057 | 9/1961 | Hackman et al. . |
| 3,045,330 | 7/1962 | Johnson et al. . |
| 3,266,820 | 8/1966 | Leborgne et al. . |
| 3,372,852 | 3/1968 | Cornell . |
| 3,735,088 | 5/1973 | Hall . |
| 3,929,270 | 12/1975 | Keith . |
| 4,023,251 | 5/1977 | Darrow . |
| 4,123,240 | 10/1978 | Kerreman et al. . |
| 4,150,775 | 4/1979 | Roden et al. . |
| 4,726,104 | 2/1988 | Foster et al. . |
| 5,511,721 | 4/1996 | Demo et al. . |

OTHER PUBLICATIONS

"Cogebi, Inc.": Data Sheet; PD–28; Cogemicanite 505.3/505.4; May 18, 1994.

"Cogebi, Inc.": Material Safety Data Sheet: Rigid Mica Plate (505) and Cogemicanite 505.2/505.3/132, dated Jan. 1, 1996.

Primary Examiner—Edward K. Look
Assistant Examiner—Liam McDowell
Attorney, Agent, or Firm—Gene D. Fleischhauer

[57] ABSTRACT

A method and assembly useful in metal joining processes is disclosed which blocks the deposition of molten metal in openings. The method and assembly employs mica material with a binder to block the flow of molten metal. In one detailed embodiment, the mica material supports elements of the articles being brazed.

16 Claims, 4 Drawing Sheets

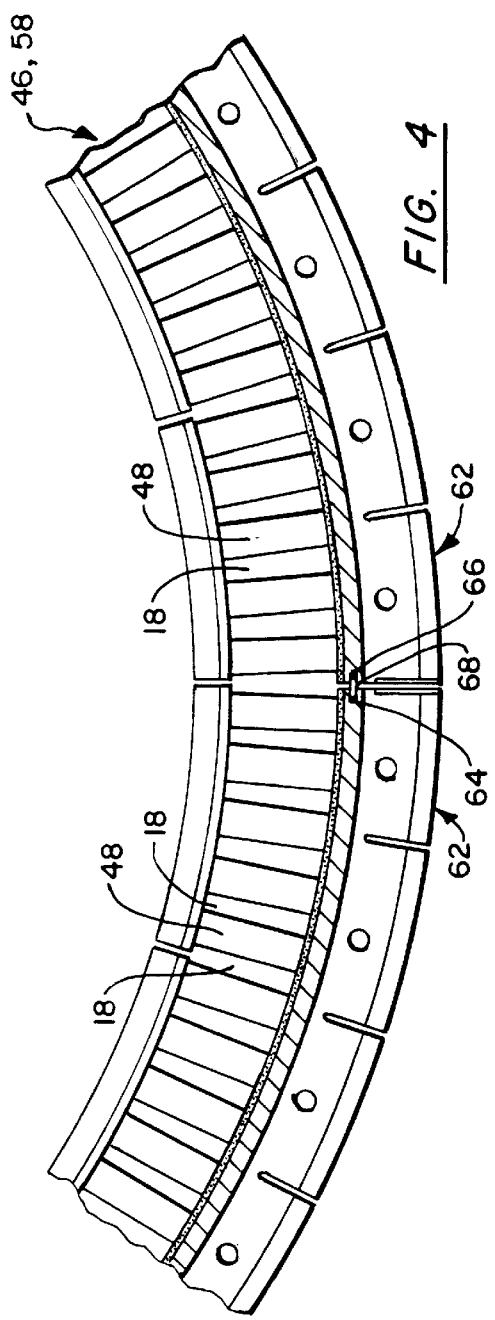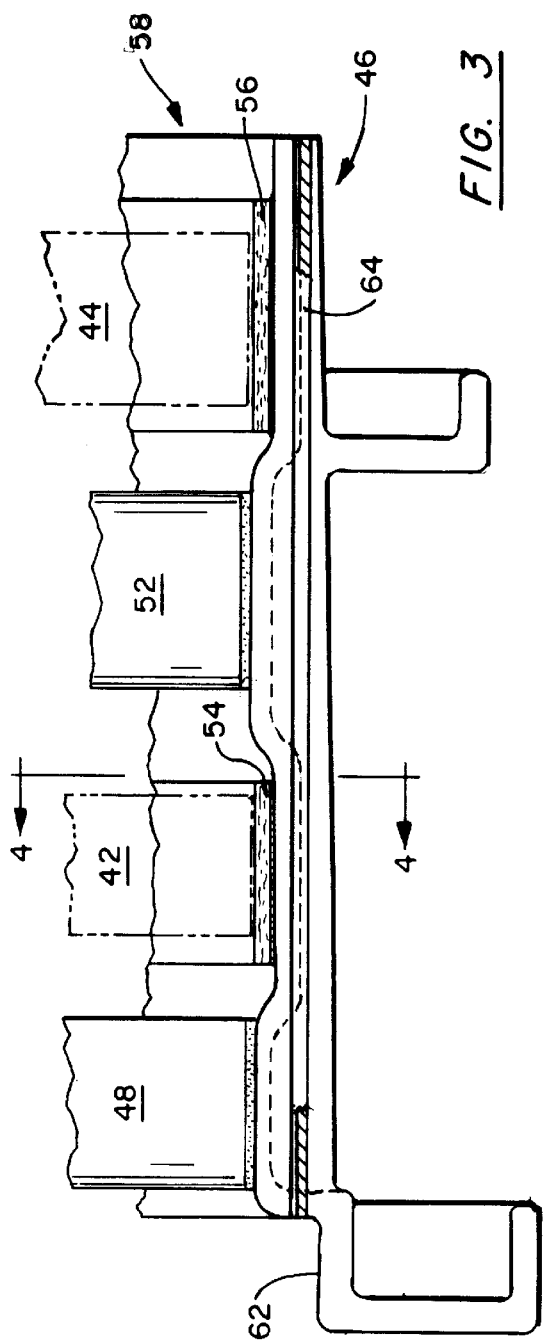
FIG. 4
FIG. 3

ASSEMBLY FOR BRAZING A STATOR COMPONENT OF A GAS TURBINE ENGINE AND METHOD BRAZING ARTICLES SUCH AS AN ABRADABLE MATERIAL TO A STATOR OF A GAS TURBINE ENGINE

TECHNICAL FIELD

This invention relates to a method for brazing articles and, more particularly, to a method for brazing an article for a gas turbine engine having an opening into which unwanted braze material might flow. The term brazing as used in this application refers to the depositing of one metal, including alloys, in the molten state on another and is typically used to unite two pieces of metal with a different metal. Methods such as brazing includes soldering, braze welding, welding and brazing. Although this invention was developed in the field of gas turbine engines, the invention has application to other fields as well.

BACKGROUND

Manufacturers of components for gas turbine engines commonly use brazing as a method for attaching articles together to form the component. These articles frequently have openings. The opening may weaken the ability of the article to resist forces exerted on the article during the brazing process. In addition, molten braze material may flow into these openings during the brazing process and harden during the brazing process, as does the braze used to attach the articles together. The manufacturer must remove the braze which greatly increases the processing time for the article.

One approach for blocking braze material from flowing into an opening is shown in U.S. Pat. No. 5,511,721 issued to Demo and Planchak entitled "Braze Blocking Insert for Liquid Phase Brazing Operations." In Demo, a pre-form insert is disposed in an opening or void in the material. The insert is composed of a refractory metal oxide powder dispersed in a polymeric solid such that the pre-form insert is solid and relatively flexible. The pre-form insert is positioned in the opening or void such that the insert completely fills the void and is retained due to friction generated by an interference fit. A portion of the insert burns off at conventional brazing temperatures leaving a metal oxide powder in the opening that is in a relatively cohesive state. The cohesive metal oxide powder prevents the flow of molten braze alloy into the opening during the brazing operation. However, the metal oxide powder does not have structural strength that would resist forces exerted on the powder. The powder is relatively easy to remove from the opening after the brazing operation.

Another approach for blocking braze material from flowing into an opening is to mask the opening with a layer of oxide material as shown in U.S. Patent 4,023,251, issued to Darrow entitled, "Method of Manufacture of Cooled Turbine or Compressor Buckets." In Darrow, cooling channels covered with a layer of oxide material will not be wet by the molten braze material. This reduces plugging of the covered cooling channels during manufacture by unwanted braze material.

Another approach is to dispose a paste stop-off material such as Braze Stop material available from the Vitta Corporation, Bethel, Conn. Braze Stop material blocks the flow of braze material into the opening. One example of the use of such a Braze Stop material occurred during the manufacture of gas turbine engines by Applicants' assignee.

Applicants' assignee manufactures such engines for military aircraft and for large commercial aircraft. Such engines have a compression section, a combustion section and a turbine section. Working medium gases are flowed through the engine, compressed and then burned with fuel to add energy to the gases. The gases are exhausted form the engine, developing useful thrust for propelling the aircraft.

The compression section includes a compressor stator for directing the working medium gases through the compression section of the engine. The compressor stator has an opening formed in one edge of the stator that adapts the stator to receive a thin sheet metal seal in its assembled condition. The thin seal helps confine the working medium gases to the working medium flowpath as the gases are flowed through the engine. The thin seal is commonly called a feather seal and the slot, a feather seal slot.

The feather seal slot, or opening, weakens the component. Forces are used during brazing to urge the abradable seal material against the braze material. These forces may cause a wall bounding the feather seal slot to deform under the high temperatures and pressures at which the brazing process takes place. This will result in unacceptable deformation of the stator.

A metal shim, such as a stainless steel shim is placed in the feather seal slot during the brazing process to prevent the collapse of the walls bounding the slot as external forces are applied to the slot during the brazing operation. The metal shim may become brazed into the slot despite the presence of the stop-off material. This requires removing the shim by a machining operation such as electro-discharge machining (EDM) or other machining operation, greatly increasing processing time. Nevertheless, the stainless steel shim provides the important function of preventing the walls of the feather seal slot from collapsing during the brazing operation.

Accordingly, scientists and engineers working under the direction of Applicant's assignee have sought to develop other approaches to brazing that block the flow of braze material into an opening in the article, such as cooling passages; and, for some applications, such as brazing near a feather seal slot, that support the article against deformation under the temperature and pressure of the brazing process when required.

SUMMARY OF THE INVENTION

This invention is in part predicated on the recognition that mica material provides a useful stop-off material for brazing and may be formed into sheets having flexural and structural strength during the brazing operation even though the mass of the sheet decreases as the sheet is heated to the brazing temperature and physical characteristics deteriorate.

According to the present invention, a method for brazing a single article or brazing two articles together while urging the articles together with a force includes, prior to heating and melting the braze material, the step of disposing a shim formed with mica material and a heat resistant binder in an opening in an article with an interference fit to block the opening against braze material which might flow into the opening.

In accordance with one detailed embodiment of the present invention, the step of disposing the shim in the opening includes compressing the shim as it is installed to offset the loss of mass of shim material as the shim is heated so that the shim supports the article against deformation.

In accordance with one embodiment of the present invention, the opening is a feather seal slot in the stator for a gas turbine engine, the stator having a wall extending over the slot which is thinner than the adjacent structure and the step of disposing a shim in the opening includes compressing layers of plate-like material formed of consolidated mica paper and a heat resistant binder with the walls of the feather seal slot, and the step of brazing includes heating the shim to a temperature that, although the temperature causes the shim to decrease in mass, the shim supports the thinner wall against deformation throughout the brazing process.

A primary feature of the present invention is disposing a shim formed with mica material and heat resistant binder in an opening. Another feature is the rigidity and strength of the shim formed of mica material and heat resistant binder after the heat resistant binder is heated to a temperature that causes loss of mass of a portion of the binder in the form of gas. Another feature is the step of compressing the shim, increasing the local density of that portion of the shim in comparison to the shim in the uninstalled condition and reducing the aggregate height of the shim in the installed condition in comparison to the uninstalled height of that portion of the shim.

A primary advantage of the present invention is the speed and efficiency at which articles having openings may be brazed together, which results from blocking the flow of unwanted braze material into openings. Another advantage is the quality of the finished brazed article which results from reinforcing the article against the brazing forces with a shim formed with mica material and a heat resistant binder, and from the ability of the shim to withstand being compressed by the opening. Still another advantage of the present invention is the ability to perform the brazing method at elevated temperatures and still have the shim retain its structural integrity which results from the ability of the shim material to endure temperatures in excess of twelve hundred degrees Fahrenheit (1200° F.). Still another advantage is the ease of removing the remaining shim material from the opening which results from the material becoming more brittle at elevated brazing temperatures above twelve hundred degrees Fahrenheit (1200° F.). Still another advantage is the ability of the shim material to resist bonding with braze material and with the adjacent structure at the same time the shim provides structural reinforcement which supports the adjacent structure of the brazed article against deformation under the forces of brazing.

The foregoing features and advantages of the present invention will become more apparent in light of the following detailed description of the best mode for carrying out the invention and accompanying drawings.

BRIEF DESCRIPTION OF THE DRAWINGS

FIG. 3 is an enlarged view of a segment of a compressor stator of the compressor section shown in FIG. 2, with a portion of the segment broken away and sectioned, and with the rotor blades of a compressor rotor assembly shown in phantom.

FIG. 4 is a view taken along the lines 4—4 of FIG. 3 showing two adjacent compressor stator segments and a feather seal disposed in facing feather seal slots in the adjacent segments.

BEST MODE FOR CARRYING OUT THE INVENTION

Figure 1:
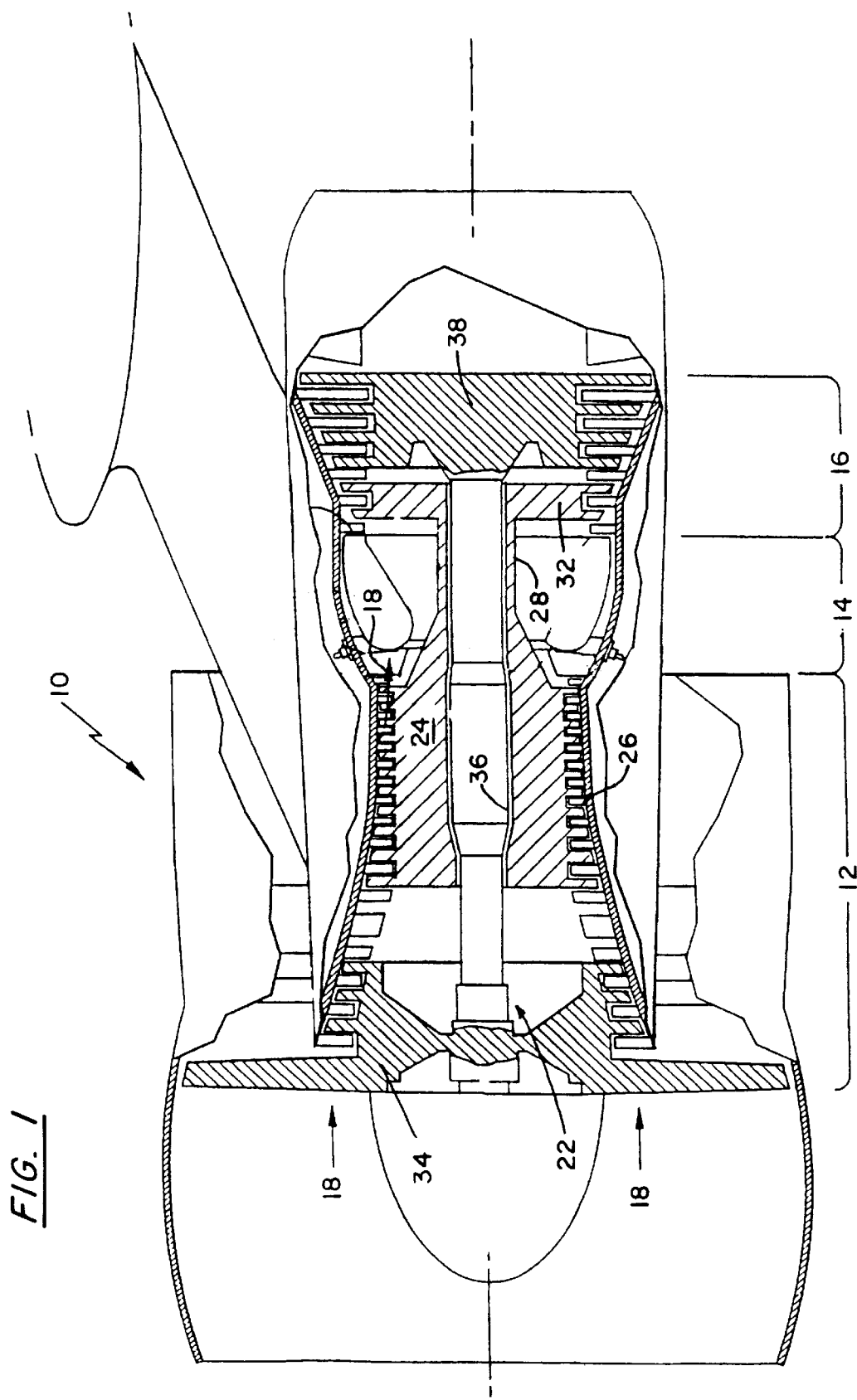
FIG. 1 is a side elevation schematic view of a gas turbine engine with the engine partially broken away to show a portion of the compressor section of the engine.

FIG. 1 is a side elevation, simplified view of a gas turbine engine 10. The view is partially broken away to show elements of the interior of the engine. The engine includes a compression section 12, a combustion section 14 and a turbine section 16. A flowpath for working medium gases 18 extends axially through the engine. The engine includes a first, low pressure rotor assembly 22 and a second, high pressure rotor assembly 24. The high pressure rotor assembly includes a high pressure compressor 26 connected by a shaft 28 to a high pressure turbine 32. The low pressure rotor assembly includes a fan and low pressure compressor 34 connected by a shaft 36 to a low pressure turbine 38. During operation of the engine 10, working medium gases are flowed along the flow path 18 through the low and high pressure compressors 26,34. The gases are mixed with fuel in the combustion section 14 and burned to add energy to the gases. The high pressure working medium gases are discharged from the combustion section to the turbine section 16. Energy from the low pressure turbine 38 and high pressure turbine 32 is transferred through their respective shafts 36,28 to low pressure compressor and high pressure compressor.

Figure 2:
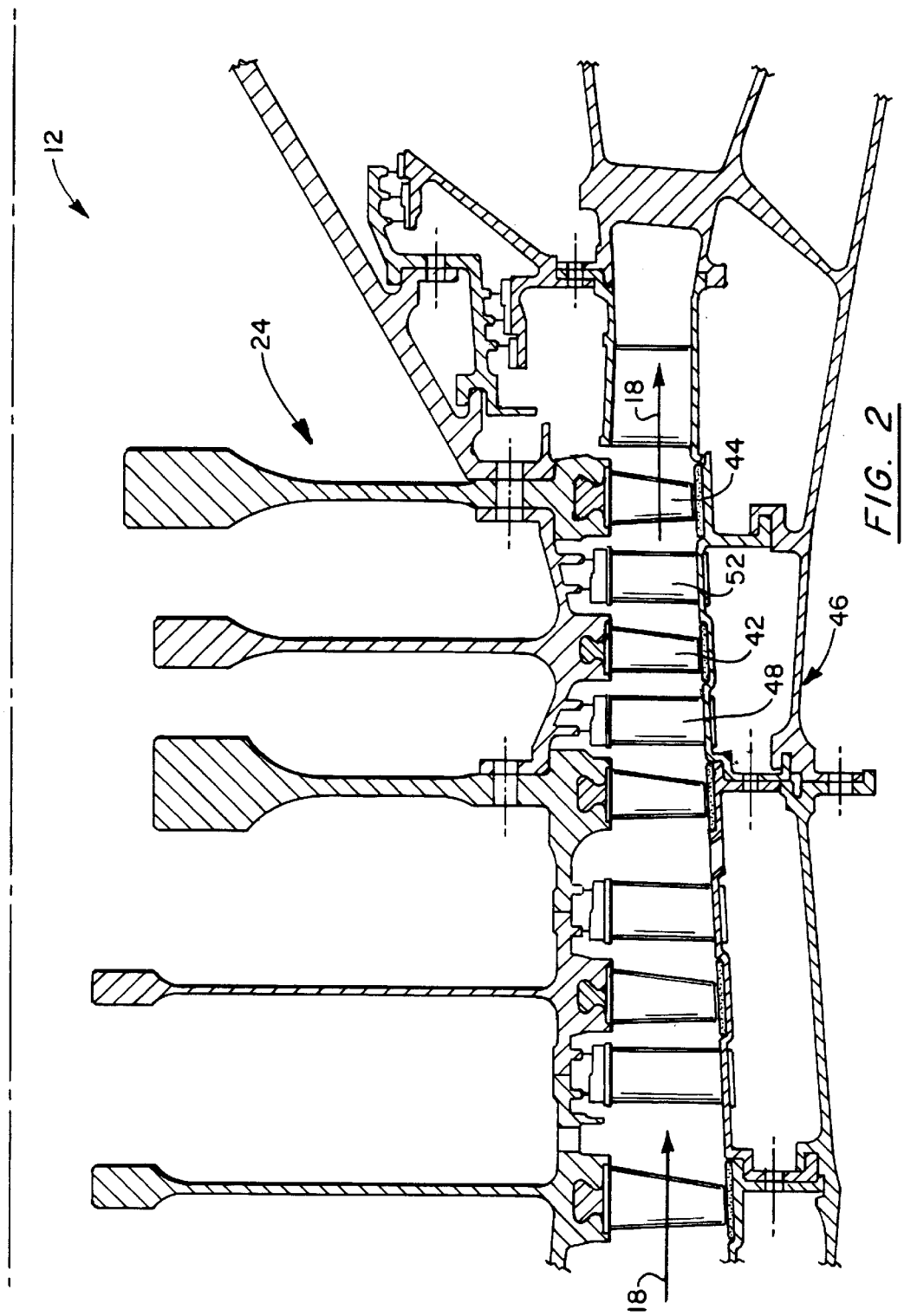
FIG. 2 is an enlarged cross-sectional view of a portion of the compressor section of the engine shown in FIG. 1.

FIG. 2 is an enlarged view of a portion of the compression section 12. The rotor assembly 24 in the high pressure compressor 26 includes a plurality of rotor blades 42,44 which extend radially outwardly across the working medium flow path 18. A stator assembly 46 circumscribes the rotor assembly to outwardly bound the working medium flowpath. A plurality of stages of stator vanes as represented by the stator vanes 48,52 extend inwardly between the stages of rotor blades to direct the working medium gases from one rotor stage to the next rotor stage.

Circumferentially extending rub strips 54,56 of abradable material are disposed radially outwardly of the rotor blades 42,44. The abradable material provides a tight clearance between the rotor blades and the stator assembly 46. This reduces the leakage of working medium gases past the rotor blades and, at the same time, accommodate the rotor blades contacting the abradable seal without damage to the rotor blades. Typically, the abradable material is attached to the compressor stator by a suitable brazing compound. For example, a compressor stator formed of INCO X-750 alloy material (Aerospace Materials Specification AMS 5671) may have a Feltmetal® abradable material attached to the stator by a braze material such as a nickel alloy.

FIG. 3 is an enlarged view of a portion of the stator assembly 46 shown in FIG. 2. The stator assembly includes a compressor stator 58. The compressor stator has the abradable rub strips or seals 54,56 and the stator vanes 48,52. A portion of the compressor stator is broken away and sectioned and the other portions are in full. The compressor stator may be formed of two or more arcuate segments 62. The segments move to accommodate thermal expansion and contraction of the compressor stator as the operating temperature of the engine varies during engine operation. A slot or opening 64 extends axially in the segment. The slot adapts the segment to receive a seal.

FIG. 4 is a view taken generally along lines 4—4 of FIG. 3 showing a portion of the compressor stator 58 shown in FIG. 3 as represented by portions of two adjacent arcuate segments 62. Each segment has the axially extending slot 64 that faces a corresponding slot 66 in the adjacent segment. A thin, sheet metal seal 68, commonly referred to as a feather seal, is disposed in the slots. The seal extends between the segments to block the loss of working medium gases from the flow path 18 under operative conditions.

Figure 5:
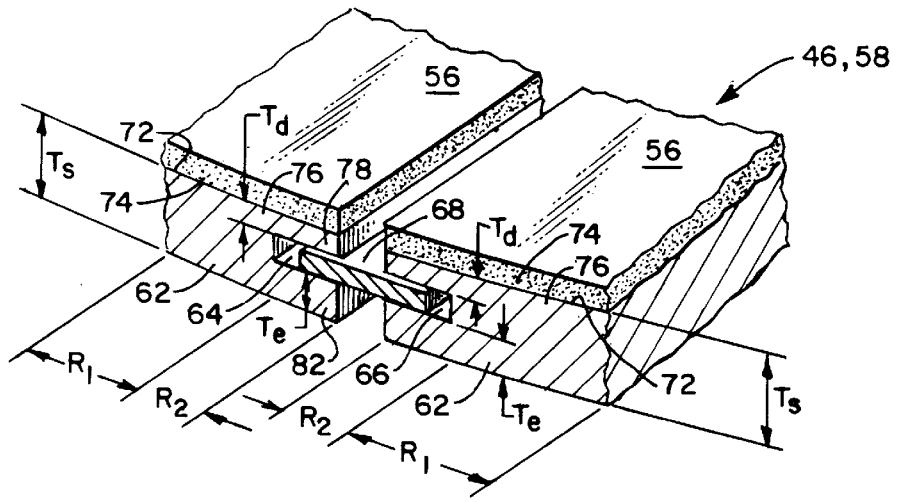
FIG. 5 is an enlarged schematic representation of a portion of FIG. 4 showing the relationship of the feather seal to the feather seal slots of the adjacent compressor stator segments and an abradable seal material attached to each of the compressor stator segments.

FIG. 5 is an enlarged, simplified perspective view of a portion of the two adjacent arcuate segments 62 of the compressor stator 58 and of the feather seal 68 disposed in the feather seal slots 64,66. The compressor stator, as represented by the arcuate segments, has a faying surface 72 which receives an abradable seal or rub strip 56. The abradable seal is assembled to the arcuate segment by brazing abrabable seal material to the faying surface of the segment.

The arcuate segment 62 of the compressor stator has a first region $R_1$. The arcuate segment in the first region has a thickness Ts beneath a first part 74 of the faying surface 72. The arcuate segment has a second region $R_2$. The feather seal slot 64 extends in the second region of the segment under a second part 76 of the faying surface. The arcuate segment further has a first wall 78 bounding the inner portion of the feather seal slot and a second wall 82 bounding the outer portion of the feather seal slot. The first wall has a thickness Td that is smaller than the thickness Ts of the adjacent region $R_1$ of the stator. The second wall has a thickness Te which is also smaller than the thickness Ts adjacent the region of the stator. In one construction formed of INCO X-750 alloy (Aerospace Material Specification AMS 5671) the thickness Ts of the adjacent region is approximately one hundred mils (0.100 inches), the thickness of the first wall is approximately twenty mils (0.020 inches) and the second wall has a thickness Te which is approximately twenty-five mils (0.025 inches).

Figure 6:
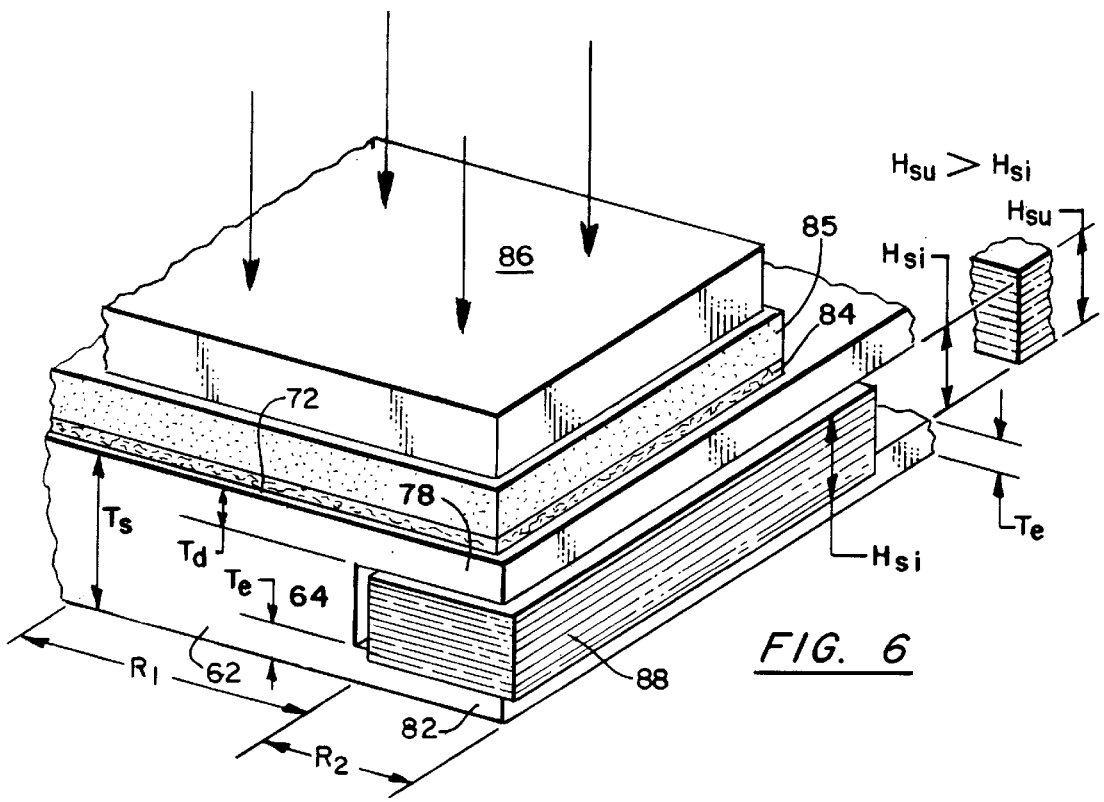
FIG. 6 is a simplified schematic perspective view of an alternate embodiment of the stator segment shown in FIG. 5 illustrating the method of brazing an abradable article to the compressor stator segment and a shim disposed in the feather seal slot formed with a mica material and a heat resistant binder.

FIG. 6 is a simplified perspective view, partially broken away of an alternate embodiment of the stator assembly shown in FIG. 5. In this alternate embodiment, the thickness Td of the first wall 78 is approximately equal to the thickness of the second wall Te. FIG. 6 shows the relationship of the individual components during the method of brazing the abradable seal or rub strip 56 to the faying surface 72 of the compressor stator 58.

The assembly of components for the brazing method includes one of the two segments 62 of the compressor stator 58. The segment has the feather seal slot or opening 64. A layer 84 of braze material is disposed on the compressor stator 58 and a layer of abradable material 85 for the abradable seal 56, such as Feltmetal ® abradable material, is disposed on the layer of braze material. A portion of a push band 86 is placed on the abradable surface of the Feltmetal ® to apply pressure to the Feltmetal ® material during the brazing method. Any other suitable device or means for applying a pressure to the abradable material may be employed. Heating the push band with the intense heat of the brazing process causes the push band to grow thermally. The thermal growth of the push band exerts pressure on the layer of abradable material as the brazing process takes place.

The method includes disposing a shim 88 in the feather seal slot. The shim has at least one layer of plate-like material or sheet stock that has been cut into sizes that will fit into the feather seal slot 64. The material for the shim is plate-like in appearance and contains mica material, such as natural mica or synthetic mica. Mica may be any of several silicates of varying chemical composition but with similar physical properties and crystalline structure. All characteristically cleave into thin sheets which are flexible and elastic. The mica material is disposed in a heat resistant binder, such as silicone resin or other suitable material, which allows the shim to perform acceptably at the temperature of the brazing process.

One satisfactory material for the shim is muscovite or phlogophite mica paper impregnated with a heat resistant binder and densified under heat. Other mica papers are believed acceptable. One plate-like material having acceptable flexural strength for supporting the article against forces may be purchased from Cogebi, Inc. 14 Faraday Drive, Dover, N.H. as Cogemicanite 505 material. This material uses Cogemica Muscovite or Cogemica Phlogophite mica paper impregnated with a heat resistant silicone binder. Layers of the impregnated paper are consolidated under heat and pressure to form the plate.

The Cogemicanite 505 material manufactured from Cogemica Phlogophite mica paper has a higher temperature rating for intermittent service capability (about eighteen hundred degrees Fahrenheit 1800° F.) than Cogemicanite 505 material manufactured from Cogemica Muscovite mica paper.

The shim 88 may be formed into a single layer of micanite sheet stock or of several layers of sheet stock, varying from 12 mils to 24 mils in thickness (0.012 inches–024 inches) and stacked or layered into the slot 64 as necessary to seal the opening. The shim has physical strength and a degree of flexibility as formed. The shim loses a portion of its flexibility becoming more brittle after being heated to temperatures in excess of twelve hundred degrees Fahrenheit (1200° F.).

In some applications, the sizing of the shims is such that a snug fit results as the shims are inserted into the slot. In other applications, the step includes pressing the shims into the slots with a light force, such as by tapping the shim with an elastomeric mallet. This wedges the shim between the walls of the feather seal slot, such that the walls exert a compressive force on the shim and the shim exerts a force against the walls of feather seal slot decreasing the uninstalled height Hsu to the installed height His..

After inserting the shim, the assembly is disposed in a vacuum brazing furnace where heating to the temperature of the brazing process takes place. For nickel braze used with abradable material, the assembly is at a temperature of nineteen hundred and twenty-five degrees Fahrenheit (1925° F.) for five to fifteen minutes and typically ten minutes. Prior to that time, the assembly is heated to intermediate temperatures in steps of several hundred degrees and held at those temperature for periods as long as an hour.

A particular advantage is blocking the brazing material with the shim 88 from flowing into the opening that is the feather seal slot 64. This prevents the braze from hardening on the walls. A reduction in processing time results from not having to remove brazed material attached to the walls of the slot and attached to the shim at the end of the brazing process.

Another advantage is the support that the shim provides to the walls of the feather seal slot. The temperature of the brazing process does cause a degradation in the ability of the walls to resist the brazing force that is applied to the walls as the brazing process takes place. The micanite shim provides structural support to the walls, resisting the brazing force which urges the walls toward each other. Any deformation of the walls may result in an unacceptable product.

It is believed the temperature of the braze cycle vaporizes a portion of the shim causing the shim to lose mass and volume. The loss in mass and increase in brittleness suggests that such a shim is unsuitable for the purposes of blocking braze and supporting the structure against deformation. But another advantage of the present invention is the change in structure of the shim as the shim is exposed to the temperature of the heat treat cycle of the brazing process.

The micanite shim does lose mass upon heating to elevated temperatures, decreasing slightly in mass and volume and becoming more brittle. Surprisingly, the remaining material, by reason of compressing the material at installation, still exerts a sufficient force during the brazing process to support the walls. It is also believed the loss in mass is a loss of material that causes the shim material to become more brittle. This brittleness aids in removing the micanite shim from the slot because the shim will crumble as a scraping force is applied to the shim. As a result, the shim does not adhere to the walls of the slot and because the shim acts as a stop off material, the braze material does not attach the shim material to the compressor stator. Thus, the shim material provides support to the feather seal slot while still being flexible enough for installation and flexible enough with some amount of brittleness for easy removal.

Although the invention has been shown and described as to detailed embodiments thereof, it should be understood by those skilled in the art that various changes in form and detail thereof may be made without departing from the spirit and scope of the claimed invention.

What is claimed is:

1. A method of brazing an article, the article having an opening bounded by a wall and a first surface which receives brazing material during the brazing method in molten form such that the brazing material is in flow communication during brazing with a region of the article in proximity to the wall, comprising:

disposing a blocking material in the opening, the blocking material having at least one layer of plate-like mica material and a heat resistant binder, which includes the step of compressing the blocking material by forcing the blocking material into the opening such that the wall of the opening exerts a compressive force on the blocking material and the blocking material exerts a force against the wall;

disposing braze material in a manner appropriate for brazing on the first surface of the article;

heating the braze material and the article to an elevated temperature for a period of time to cause the braze material to melt;

wherein the temperature of the step of heating vaporizes a portion of the blocking material causing the blocking material to decrease in volume; wherein the remaining material of the blocking material is closely adjacent to the wall and wherein the braze material is blocked from entering the opening by the remaining material of the blocking material.

2. A method of brazing a first article and a second article, the first article having an opening bounded by a wall and a faying surface to which the second article is attached by braze material, the improvement comprising:

disposing a shim in the opening, the shim having at least one layer of plate-like mica material and a heat resistant binder, which includes the step of compressing the shim by forcing the shim into the opening such that the wall of the opening exerts a compressive force on the shim and the shim exerts a force against the the wall.

disposing braze material and the second article in a manner appropriate for brazing on the faying of the first article;

applying a pressure against the first article, braze material and against the faying surface;

heating the braze material, abradable material and the second article to an elevated temperature for a period of time to cause the braze material to melt;

wherein the temperature of the step of heating vaporizes a portion of the shim causing the mass of the shim to decrease; wherein the remaining material of the shim is closely adjacent to the wall and wherein the braze material is blocked from entering the opening by the remaining material of the shim.

3. The method of brazing two articles of claim 2 wherein the opening is of such an extent that the region adjacent the opening is deformable in response to the brazing force at the brazing temperature, and wherein the step of disposing the shim in the opening further includes compressing the shim to an extent that the shim exerts a force on the wall of the opening that resists the force used in the step of brazing and wherein the loss of mass of the shim is offset to an extent by compression of the shim such that the shim blocks de formation of the region adjacent the opening,.

4. The method of brazing two articles of claim 2 which further includes the step of removing the shim material from the opening and wherein the step of heating the shim material increases the brittleness of the shim material and portions of the shim material crumble in response to a scraping force exerted on the material.

5. The method of brazing two articles of claim 3 which further includes the step of removing the shim material from the opening and wherein the step of heating the shim material increases the brittleness of the shim material and portions of the shim material crumble in response to a scraping force exerted on the material.

6. The method of brazing an article of claim 1 wherein the the mica material in the shim is an alkali aluminum silicate.

7. The method of brazing an article of claim 6 wherein the alkali aluminum silicate material is phlogopite.

8. The method of brazing an article of claim 1 wherein the heat resistant binder in the shim is a silicone resin.

9. The method of brazing two articles of claim 2 wherein the the mica material in the shim is an alkali aluminum silicate.

10. The method of brazing two articles of claim 9 wherein the alkali aluminum silicate material is phlogopite.

11. The method of brazing an article of claim 2 wherein the heat resistant binder in the shim is a silicone resin.

12. A method of brazing an abradable seal material to a compressor stator which is disposed circumferentially about an axis of symmetry, the stator having a faying surface to which the abradable seal material is attached by braze material, having a region which has a thickness Ts beneath a first part of the faying surface, the stator having an axially extending edge having a feather seal slot extending axially along the edge of the compressor stator under a second part of the faying surface, the stator further having walls bounding the feather seal slot, one of which extends under the second part of the faying surface and which has a thickness Td which is smaller than the thickness Ts of the adjacent region of the stator, comprising:

disposing a shim in the featherseal slot having at least one layer of plate-like material consisting essentially of mica disposed within a heat resistant binder, which includes the step of compressing the shim by forcing the shim into the slot such that the walls of the featherseal slot exert a compressive force on the shim and the shim exerts a force against the thinner wall of the featherseal slot;

disposing abradable material and braze material on the surface of the compressor stator;

applying a pressure against the abradable material, braze material and against the faying surface extending over the region of the stator having the thickness Ts and over the thinner wall of the feather seal slot having the thickness Td;

heating the braze material, abradable material and the stator structure to an elevated temperature to cause the braze material to melt;

wherein the temperature of the step of heating vaporizes a portion of the shim causing the shim to decrease in size; wherein the remaining material of the shim presses against the wall of the featherseal slot to support the wall having decreased thickness Td during the brazing process at elevated temperatures and pressures and wherein the braze material is blocked from entering the featherseal slot by the remaining material of the shim.

13. The method of brazing an abradable seal of claim 12 which further includes a step of removing the shim material from the feather seal slot and wherein the step of heating increases the brittleness of the shim material and the shim material crumbles in response to a scraping force exerted on the material.

14. The method of brazing an abradable seal of claim 12 wherein the step of heating the braze material and the compressor stator includes heating the shim material to a temperature greater than twelve hundred degrees Fahrenheit for at least an hour and then heating the materials to a final temperature Tf greater than sixteen hundred degrees Fahrenheit.

15. The method of brazing an abradable seal of claim 13 wherein the step of heating the shim material includes disposing the shim material in an environment which is at a temperature greater than eighteen hundred degrees for a period of five to fifteen minutes.

16. An assembly for forming an arcuate segment for a gas turbine engine having an abradable seal material which is attached by brazing to the segment, the segment being disposed circumferentially about an axis of symmetry, which comprises:

a stator segment having a faying surface which adapts the segment to receive abradable seal material, the abradable seal material being attached to the segment by braze material in the assembled condition, the stator segment having a first region having a thickness Ts beneath a first part of the faying surface, the stator segment having an axially extending edge having a feather seal slot extending axially along the edge of the compressor stator under a second part of the faying surface, the stator further having walls bounding the feather seal slot, one of which extends under the second part of the faying surface and which has a thickness Td which is smaller than the thickness Ts of the adjacent region of the stator segment;

a shim disposed in the featherseal slot having at least one layer of plate-like material consisting essentially of mica disposed within a heat resistant binder, the shim being compressed by forcing the shim into the slot, the shim having an installed height which is less than the uninstalled height of the shim such that the walls of the featherseal slot exert a compressive force on the shim and the shim exerts a force against the thinner wall of the featherseal slot;

a layer of abradable material and a layer of braze material disposed on the faying surface of the stator segment, the layer of braze material being disposed between the abradable material and the faying surface of the stator segment;

means for applying pressure during a brazing cycle against the abradable material, braze material and against the faying surface extending over the region of the stator having the thickness Ts and over the thinner wall of the feather seal slot having the thickness Td;

wherein heating the braze material, abradable material and the stator structure to an elevated temperature causes the braze material to melt during the method of brazing; wherein the temperature of the braze cycle vaporizes a portion of the shim causing the shim to decrease in size; wherein the remaining material of the shim presses against the wall of the featherseal slot to support the wall having decreased thickness Td during the brazing process at elevated temperatures and pressures and wherein the braze material is blocked from entering the featherseal slot by the remaining material of the shim.

* * * * *